United States Patent
Perez (10) Patent No.: US 9,903,211 B2
(45) Date of Patent: Feb. 27, 2018

(54) COMPOSITE BLADE MADE BY ADDITIVE MANUFACTURING

(71) Applicant: Techspace Aero S.A., Herstal (Milmort) (BE)

(72) Inventor: Rafael Perez, Boncelles (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 486 days.

(21) Appl. No.: 14/471,979

(22) Filed: Aug. 28, 2014

(65) Prior Publication Data
US 2015/0064015 A1 Mar. 5, 2015

(30) Foreign Application Priority Data

Aug. 28, 2013 (EP) ..................................... 13181971

(51) Int. Cl.
*F01D 5/28* (2006.01)
*B29D 99/00* (2010.01)
(Continued)

(52) U.S. Cl.
CPC .............. *F01D 5/282* (2013.01); *B28B 1/001* (2013.01); *B29C 45/14631* (2013.01);
(Continued)

(58) Field of Classification Search
CPC .... F01D 5/282; F01D 5/147; F05D 2300/603; F05D 2230/31; F29C 67/0077;
(Continued)

(56) References Cited

U.S. PATENT DOCUMENTS 3,762,835 A   10/1973 Carlson et al.
3,892,612 A * 7/1975 Carlson ................... F01D 5/282
                                                        156/150
(Continued)

FOREIGN PATENT DOCUMENTS

CN   101649844 B   10/2011
CN   103113112 A    5/2013
(Continued)

OTHER PUBLICATIONS

European Search Report dated Jan. 28, 2014 for EP 13181971.6.

*Primary Examiner* — Marina Tietjen
(74) *Attorney, Agent, or Firm* — James E. Walton (57) ABSTRACT

The present application relates to a blade of a rectifier of a low pressure compressor of an axial turbomachine. The blade can also be a rotor and/or turbine blade. The blade includes a composite material with a matrix and a reinforcement comprising a mesh with rods. The rods of the reinforcement are connected to each other and are distributed throughout the volume between the pressure side surface and the suction side surface of the blade. The mesh forms a three-dimensional structure extending over the majority of the thickness of the blade between the pressure side surface and the suction side surface and/or the majority of the length of the blade between the leading edge and the trailing edge. The present application also relates to an iterative method for manufacturing a blade composite where the reinforcement is formed by additive layer manufacturing based on titanium powder and then placed in an injection mold.

20 Claims, 3 Drawing Sheets

(51) Int. Cl.
- B29C 45/14 (2006.01)
- B28B 1/00 (2006.01)
- B29C 70/70 (2006.01)
- B33Y 10/00 (2015.01)
- B33Y 80/00 (2015.01)
- B29K 79/00 (2006.01)
- B29K 305/00 (2006.01)
- B29K 309/02 (2006.01)
- B29L 31/08 (2006.01)
- B29C 67/00 (2017.01)

(52) U.S. Cl.
CPC .......... *B29C 70/70* (2013.01); *B29D 99/0025* (2013.01); *B29C 67/0051* (2013.01); *B29K 2079/085* (2013.01); *B29K 2305/00* (2013.01); *B29K 2309/02* (2013.01); *B29L 2031/08* (2013.01); *B33Y 10/00* (2014.12); *B33Y 80/00* (2014.12); *F05D 2230/30* (2013.01); *F05D 2230/31* (2013.01); *F05D 2300/44* (2013.01); *F05D 2300/6031* (2013.01); *F05D 2300/6032* (2013.01); *F05D 2300/6033* (2013.01)

(58) Field of Classification Search
CPC .......... B29K 2505/08; B29K 2105/251; B29K 2079/085; B29L 2031/08; B22F 5/04; B22F 7/08; B22F 3/1055; Y02P 10/295

USPC ........................................................ 416/230
See application file for complete search history.

(56) References Cited

U.S. PATENT DOCUMENTS

| | | | |
|---|---|---|---|
| 5,951,254 A | * | 9/1999 | Sikorski .................. B32B 15/02 416/224 |
| 8,715,439 B2 | * | 5/2014 | Chakrabarti .......... C04B 37/025 156/89.11 |
| 2006/0216154 A1 | * | 9/2006 | McMillan ............... F01D 5/282 416/241 R |
| 2006/0275132 A1 | * | 12/2006 | McMillan ............. B29C 70/222 416/224 |
| 2012/0201686 A1 | | 8/2012 | Fromentin |
| 2013/0195671 A1 | * | 8/2013 | El-Wardany ............ F01D 5/286 416/229 R |

FOREIGN PATENT DOCUMENTS

| | | |
|---|---|---|
| DE | 102009048665 A1 | 3/2011 |
| EP | 2319641 A1 | 5/2011 |
| EP | 2620240 A1 | 7/2013 |
| FR | 2204215 A5 | 5/1974 |

* cited by examiner

Fig. 7 of composite sheets. These sheets have long fibers of graphite which are embedded in a cured resin. In addition, the blade comprises several layers of wire mesh inserted between the composite sheets and plated on the primary structure. The metal meshes are filled in advance with resin which crosslinks with the resin of the stack during molding. However, the mechanical strength of such a blade is limited. In addition, its production requires more preparation operation and handling of sheets that increase the cost of such a blade.

COMPOSITE BLADE MADE BY ADDITIVE MANUFACTURING

This application claims priority under 35 U.S.C. § 119 to European Patent Application No. 13181971.6, filed 28 Aug. 2013, titled "Composite Blade Made by Additive Manufacturing," which is incorporated herein by reference for all purposes.

BACKGROUND

1. Field of the Application

The present application relates to a turbomachine composite blade. More particularly, the present application relates to a composite blade with reinforcement and a matrix. The present application also relates to a turbine engine with a blade according to the present application. The present application also relates to a method of manufacturing a composite blade with reinforcement and a matrix.

2. Description of Related Art

An axial turbomachine comprises annular rows of rotor blades for accelerating a flow of air, and annular rows of stator blades which redress or rectify the accelerated flow of air. The blades must be lightweight to reduce the mass of the turbomachine. In particular, the reduction of rotor blades reduces the inertia of the rotor.

The reduction of weight of a blade must nevertheless comply with criteria of mechanical strength. A blade must withstand vibrations and possibly intakes in the turbomachine. Furthermore, a rotor blade must withstand centrifugal forces. The choice of a composite material for making a blade is a compromise to reduce its weight while maintaining a certain mechanical resistance.

FR 2 204 215 A5 discloses a composite rotor blade of an axial turbocharger. The blade comprises a primary structure formed of a stack of composite sheets. These sheets have long fibers of graphite which are embedded in a cured resin. In addition, the blade comprises several layers of wire mesh inserted between the composite sheets and plated on the primary structure. The metal meshes are filled in advance with resin which crosslinks with the resin of the stack during molding. However, the mechanical strength of such a blade is limited. In addition, its production requires more preparation operation and handling of sheets that increase the cost of such a blade.

Although great strides have been made in the area of composite blades, many shortcomings remain.

DETAILED DESCRIPTION OF THE PREFERRED EMBODIMENT

The present application aims to solve at least one of the technical problems of the prior art. More particularly, the present application aims to strengthen a composite dawn. The present application also aims to provide a method of producing a blade according to the present application.

The present application relates to a turbomachine blade, the blade comprising a composite material with a matrix and a reinforcement comprising a mesh, the blade having a leading edge, a trailing edge, a pressure side surface and a suction side surface, both surfaces extending from the leading edge to the trailing edge, remarkable in that the mesh forms a three-dimensional structure extending over the majority of the thickness of the blade between the pressure side surface and the suction side surface and/or the majority of the length of the blade between the leading edge and the trailing edge.

According to an advantageous embodiment of the present application, the mesh comprises an envelope which defines a space occupying the majority of the thickness of the blade between the pressure side surface and the suction side surface and/or the majority of the length of the blade between the leading edge and the trailing edge, preferably the space of the envelope occupies the majority of the volume between the pressure side surface and the suction side surface.

According to an advantageous embodiment of the present application, the three-dimensional reinforcing structure comprises interconnected rods, the rods being preferably connected together with material continuity by connecting nodes, the number of rods connected to the connecting nodes can vary.

According to an advantageous embodiment of the present application, the rods define there between polyhedrons which occupy most of the volume between the pressure side surface and the suction side surface, preferably more than 75% of said volume, more preferably more than 95% of said volume.

According to an advantageous embodiment of the present application, the structure comprises at least one, preferably multiple sets of interconnected rods, each set forming a junction, the junction(s) extending over the majority of the thickness and the blade and/or the majority of the length of the blade and/or the majority of the height of the blade.

According to an advantageous embodiment of the present application, the rods forming a junction are inclined by less than 60° with respect to the main direction of said junction, preferably less than 45°, more preferably less than 30°.

According to an advantageous embodiment of the present application, the majority of the rods connected to a common rod are inclined by more than 10° relative to the common rod, preferably by more than 25°, more preferably by more than 60°.

According to an advantageous embodiment of the present application, at least one rod is generally flat, and/or at least one rod is generally spherical.

According to an advantageous embodiment of the present application, the rods are of different lengths and/or different widths.

According to an advantageous embodiment of the present application, the volume density of the mesh as such comprised between 1% and 80%, preferably between 5% and 50%, more preferably between 10% and 20%.

According to an advantageous embodiment of the present application, the volume density of the mesh between the pressure side surface and the suction side surface varies depending on the height of the blade and/or from the leading edge to the trailing edge, preferably the blade comprising fixing means, the volume density of the mesh increasing in the direction of the fastening means.

According to an advantageous embodiment of the present application, the reinforcement is made in one piece and produced by a method of additive layer manufacturing.

According to an advantageous embodiment of the present application, the matrix and the reinforcement are made of different materials, the matrix including a thermoplastic resin and the reinforcement comprising metal, preferably titanium.

According to an advantageous embodiment of the present application, the rods are oriented in at least three non-coplanar directions, preferably by at least four non-coplanar directions.

According to an advantageous embodiment of the present application, the reinforcement comprises, in addition, one or more walls forming the leading edge and/or trailing edge and/or the pressure side surface and/or the suction side surface of the blade, said one or more walls being preferably unitary with the mesh.

According to an advantageous embodiment of the present application, the three-dimensional structure extends through the thickness of the blade on the majority of the thickness of the blade.

According to an advantageous embodiment of the present application, the three-dimensional structure extends perpendicular to the suction side surface on the majority of the thickness of the blade.

According to an advantageous embodiment of the present application, the three-dimensional structure forms a three-dimensional mesh.

According to an advantageous embodiment of the present application, the envelope may be a general envelope which delimits a space occupying the majority of the volume between the pressure side surface and the suction side surface.

According to an advantageous embodiment of the present application, the rods which are connected together are each directly connected to each other.

According to an advantageous embodiment of the present application, the reinforcement comprises more than one hundred, preferably more than thousand, rods connected to each other.

According to an advantageous embodiment of the present application, the rods are distributed in the volume between the pressure side surface and the suction side surface.

According to an advantageous embodiment of the present application, at least one rod is curved.

According to an advantageous embodiment of the present application, at least one rod has a section variation.

According to an advantageous embodiment of the present application, the rods together delimit polyhedrons which form a three-dimensional mesh.

According to an advantageous embodiment of the present application, at least one rod is generally cubic.

According to an advantageous embodiment of the present application, each set of rods comprises at least three rods, preferably at least six rods, more preferably at least ten rods.

According to an advantageous embodiment of the present application, the junction(s) extend over the thickness of the blade and/or the length of the blade and/or the height of the blade.

The thickness, length and height of the blade are considered respectively in any sections, any length, and in any height of the blade. These dimensions may correspond to minimum values, average values or maximum values.

The present application also relates to a turbomachine blade, the blade comprising a composite material with a matrix and a reinforcement, the blade comprising a leading edge, a trailing edge, a pressure side surface and a suction side surface, both surfaces extending from the leading edge to the trailing edge, remarkable in that the reinforcement comprises a network of interconnected cavities, the network extending between the pressure side surface and the suction side surface and is filled with the matrix.

According to an advantageous embodiment of the present application, the cavities communicate with each other through passages formed in the reinforcement, the passageways being filled with the matrix.

According to an advantageous embodiment of the present application, the cavities are generally polyhedrons, for example cubes or tetrahedrons.

According to an advantageous embodiment of the present application, at least one, preferably several, possibly all polyhedron edges are beveled so as to leave there between portions of the reinforcement which form bars which are interconnected.

According to an advantageous embodiment of the present application, the bars have the same characteristics as the rods of reinforcing the blade according to the present application.

According to the present application, all the different technical characteristics listed above can be combined.

The present application also relates to a method of manufacturing a composite blade comprising the steps of: (a) producing a reinforcement comprising a mesh; (b) insertion of the reinforcement into an injection mold; (c) injecting and polymerizing a resin in the injection mold so to fill the lattice; (d) removing the composite blade from the mold; remarkable in that the reinforcement in step (a) is made by additive layer manufacturing.

According to an advantageous embodiment of the present application, the three dimensional structure of the reinforcement comprises interconnected rods and the roughness Ra of the rods is greater than 2 µm, preferably greater than 10 µm, more preferably greater than 50 µm.

According to an advantageous embodiment of the present application, the layer thickness is less than 200 µm, preferably less than 50 µm, more preferably less than 10 µm.

According to an advantageous embodiment of the present application, the powder comprises grains of size of less than 200 µm, preferably less than 2 µm, more preferably less than 50 nm.

The present application also relates to a turbomachine comprising at least one blade, remarkable in that the blade is according to the present application and/or the blade is manufactured according to a method of manufacturing a composite blade according to the present application.

The present application can enhance a composite blade by giving a three-dimensional reinforcement extending in the core of the blade. Such a reinforcement provides to the blade homogeneous resistance to mechanical stresses. Reinforcement forms a heterogeneous skeleton through rods whose forms are locally adapted in response to stresses in the composite material. In addition, the rods and the walls are secured, thereby improving the robustness of the assembly.

The use of an additional manufacturing process allows to manufacture a blade by reducing the handling necessary for such a blade. This technique facilitates the achievement of such curved channels, which extend along the blade and which are formed in the reinforcement. Furthermore, the additive manufacturing, par example based on powders, creates rods with a granular surface which facilitates the anchoring of the matrix on each rod.

In the following description, the terms interior or internal and exterior or external refer to a position in relation to the axis of rotation of an axial turbomachine.

Figure 1:
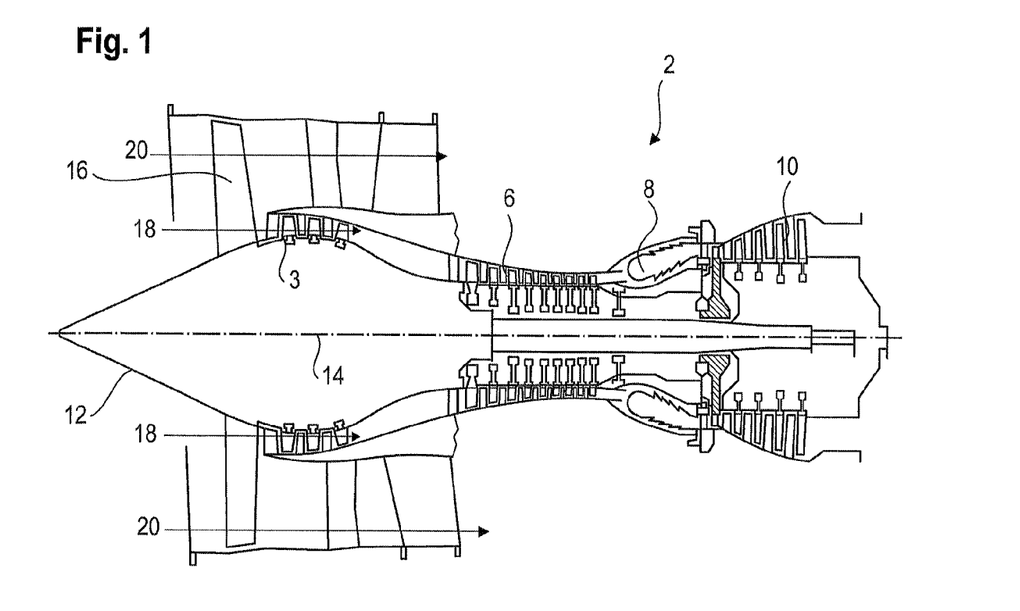
FIG. 1 shows an axial turbomachine according to the present application.

FIG. 1 schematically shows an axial turbomachine. It is in this case a double-flow turbojet. The turbojet 2 comprises a first compression level, designated low-pressure compressor 3, a second level of compression, designated high pressure compressor 6, a combustion chamber 8 and one or more turbine stages 10. During operation, the mechanical power of the turbine 10 transmitted via the central shaft to the rotor 12 moves the two compressors 3 and 6. Means providing a higher transmission ratio may increase the speed of rotation transmitted to the compressors. Alternatively, the various turbine stages may each be connected to compressor stages via concentric shafts. These include several blade rows associated with blade rows rotor stators. Rotation of the rotor about its axis of rotation 14 and generates a flow of air and gradually compress the latter until the entry of the combustion chamber 8.

An intake fan 16 is coupled to the fan rotor 12 and generates an air flow which is divided into a primary flow 18 passing through the above mentioned different stages of the turbomachine, and a secondary flow 20 through an annular conduit (shown in part only) along the machine that then joins the main flow at the turbine outlet. The primary flow 18 and secondary flow 20 are annular; they are channeled by the casing of the turbomachine. For this purpose, the housing has cylindrical walls or shells which may be internal and external.

Figure 2:
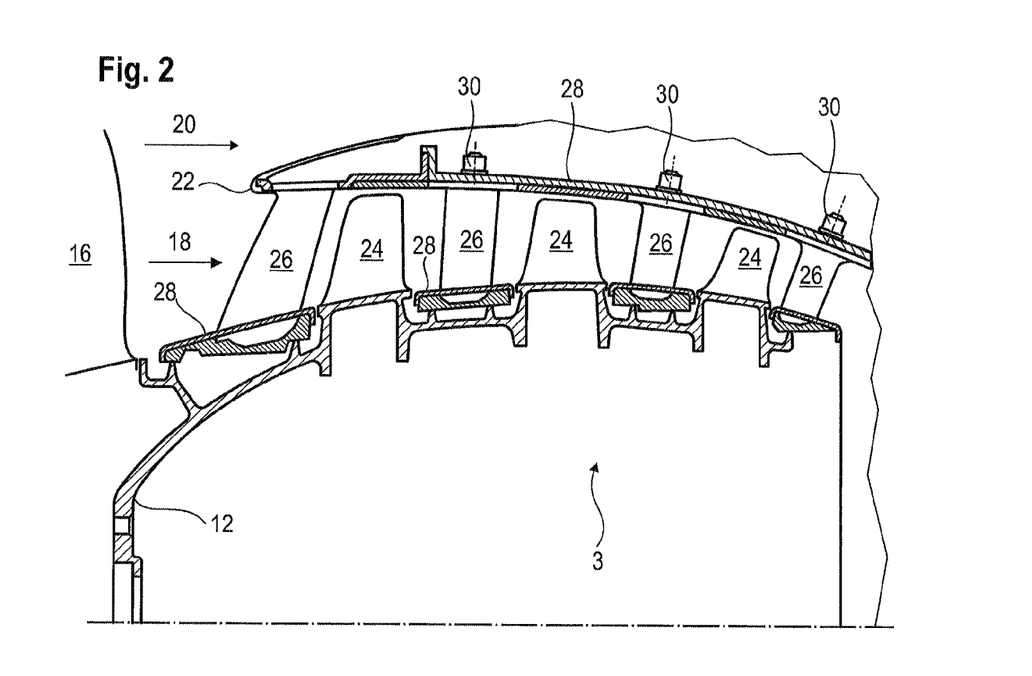
FIG. 2 is a diagram of a turbomachine compressor according to the present application.

FIG. 2 is a sectional view of an axial compressor of a turbomachine 2 as in FIG. 1. The compressor may be a low-pressure compressor or high-pressure 3. One can observe a portion of the fan 16 and the separation nozzle 22 for the primary flow 18 and secondary flow 20. The rotor 12 comprises several rows of rotor blades 24, in this case three.

The low pressure compressor 3 comprises a plurality of rectifiers, in this case four, which each contain a row of stator blades 26. Rectifiers are associated with the fan 16 or with a row of rotor blades to redress or rectify the flow of air, so as to convert the velocity of the flow into pressure.

The stator blades 26 extend substantially radially from an outer casing 28, and can be fixed by means of fixing means such a threaded rod 30. They are regularly spaced from each other and have a same angular orientation in the flow. Advantageously, the blades of one row are identical. Optionally, the spacing between the blades can vary locally as well as their angular orientation. Some blades may be different from the rest of the blades in their row.

Figure 3:
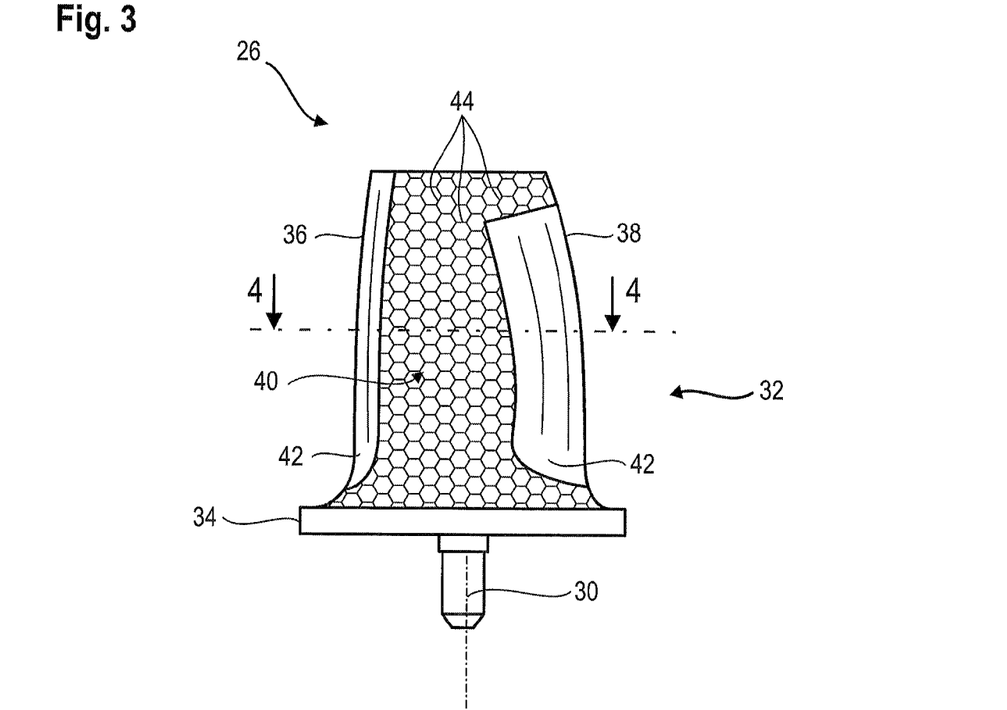
FIG. 3 illustrates a blade of the present application.

FIG. 3 is an illustration of a rectifier stator blade 26 according to the present application. The blade may be a compressor blade or a turbine blade.

The blade 26 includes an airfoil 32, or body, for extending into the annular flow. It may comprise an outer platform 34 for attachment to the outer casing of the compressor. Optionally the blade 26 has a second platform, disposed at the interior side. Fastening means 30 may extend from the platform 34 opposite to the airfoil 32. The airfoil of the blade may be directly fixed to the casing of the turbomachine, such as by welding. In this case, the blade may be free of external platform. The inner end of the blade may comprise an opening to serve as an anchor to an inner annular ferrule.

According to an alternative of the present application, the blade may be a rotor blade. As a fixing means, such a blade may include a dovetail for insertion into a corresponding groove of the rotor. The blade can be a fan blade.

The blade 26 has a leading edge 36 disposed upstream, and a trailing edge 38 located downstream. It also has a pressure side surface or intrados disposed on the discharge side of the blade, and a suction side or extrados surface disposed on the suction side of the blade. The pressure side surface and the suction side surface extend from the leading edge 36 to the trailing edge 38. They are curved and convex respectively, and define the shape of the airfoil 32.

The blade 26 comprises a composite material with a matrix (not shown) and a reinforcement 40. The reinforcement 40 may comprise a mesh that forms a three-dimensional structure. The three dimensional structure may extend in the majority volume of the airfoil 32 of the blade, possibly over the entire volume. The three dimensional structure may extend over the majority of the thickness of the blade between the pressure side surface and the suction side surface. The three dimensional structure may extend over the majority of the length of the blade 26 between the leading edge 36 and trailing edge 38. Thickness of the blade can be taken perpendicular to the chord; the length of the blade can be seen along the chord.

The mesh may include an envelope, possibly an outer envelope. The envelope may conform to all exterior surfaces of the mesh. The envelope can follow the boundaries of the grid and define the contours. The envelope defines a space or internal space, which extends or occupies at least 10%, preferably the majority of the thickness of the blade 26 between the pressure side surface and the suction side surface; and/or which extends or occupies at least 10%, preferably the majority of the length of the blade between the leading edge and the trailing edge. Optionally, the space of the envelope occupies the majority of the volume between the pressure side surface and the suction side surface.

The three-dimensional structure can comprise a three-dimensional mesh, which is optionally defined by polyhedrons filling the volume between the pressure side surface and the suction side surface. The polyhedrons may be defined by connecting nodes. The reinforcement may have cavities which form an interconnecting network of channels which extend over the majority of the blade, which preferably extend generally over the whole volume of the blade. Advantageously, the cavities are filled by the reinforcing matrix. Advantageously, the platform(s) and/or the fastening means are secured to the reinforcement. Preferably, they are integral.

Optionally, the reinforcement 40 of the blade 26 includes a wall 42 forming the leading edge of the blade. The wall 42 may be a plate extending on the pressure side and on the suction side. The reinforcement 40 of the blade may comprise a wall 42 forming at least a portion of the suction side surface or at least a portion of the pressure side surface so as to protect the blade 26 against abrasion.

The three-dimensional structure may include rods 44. Rods 44 are connected or secured to each other, e.g. with material continuity via connecting nodes. Preferably, each of the rods is directly connected to other rods, optionally more than three rods. These rods 44 may be distributed or scattered into the volume between the pressure side surface and the suction side surface. These rods 44 may be distributed or scattered in the majority said volume, preferably over the whole volume. The rods 44 can be connected to each other by their ends. They are arranged end to end, and are preferably inclined with respect to the rods to which they are connected. Optionally, at the same end, a rod may be connected to a collinear rod, the number of collinear rods being preferably in minority compared to the number of rods connected to the end in question.

The reinforcement 40 is preferably formed integrally. The rods 44 are connected together are made integrally, preferably the walls 42 and the rods 44 are formed integrally. Thus, the rods 44 are secured to the walls 42 and form an integral mechanical assembly.

The three-dimensional structure comprises at least one set of interconnected rods 44 which form a junction, preferably multiple sets of interconnected rods, each set forming a junction 44. A junction may extend over more than 10%, preferably more than 80% of the thickness of the blade; and/or more than 10%, preferably more than 80% of the length of the blade; and/or more than 10%, preferably more than 80% of the height of the blade. The junctions may extend from the pressure side surface to the suction side surface, possibly being generally inclined relative to the directions perpendicular to these surfaces.

Each set comprises at least three rods, preferably more than twenty rods. Each junction has a main direction, which can be defined by the ends of the junction concerned. The rods of the same junction are inclined relative to its main direction, preferably by more than 5°.

Figure 4:
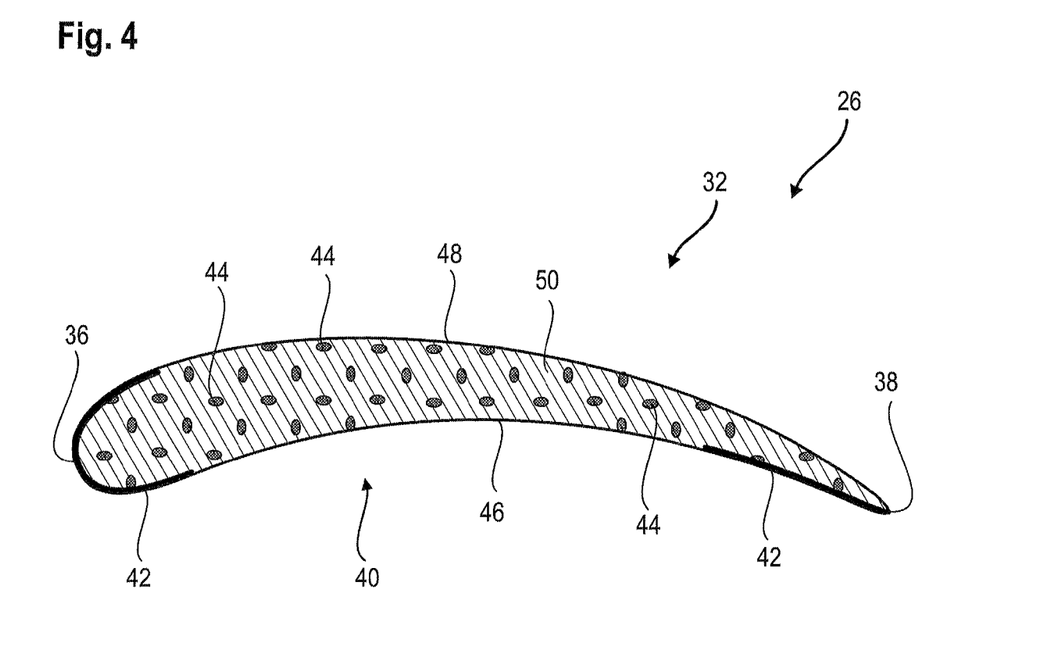
FIG. 4 shows a cross-section of the blade according to the present application along the axis 4-4 plotted in FIG. 3.

FIG. 4 outlines a cross-section of the blade along the axis 4-4 in FIG. 3.

The average thickness of the reinforcement 40 can represent more than 10%, preferably more than half of the average distance between the pressure side surface 46 and suction side surface 48 of the blade. Optionally, the average thickness of the space occupied by the rods 44 connected to each other corresponds to more than 10%, preferably more than half of the average spacing between the pressure side surface 46 and suction side surface 48.

The rods 44 are embedded in the matrix 50. Matrix 50 occupies most of the volume of the airfoil 32, preferably over 75%. The matrix 50 may form the majority of the pressure side surface 46 and/or the suction side surface 48. Rods 44 may be flush and form portions of the pressure side surface 46 and/or the suction side surface 48. Matrix 50 can form the leading edge 36 and/or the trailing edge 38.

The rods 44 are generally connected to other rods 44. Most rods 44 are linked to several other rods 44, preferably at least six, more preferably at least eight other rods 44. Interconnected rods 44 form continuous mechanical linkages which extend from the leading edge 36 to trailing edge 38, and/or from the pressure side surface 46 to the suction side surface 48 and/or from the inner end of the blade to the outer end of the blade. These mechanical connections have a continuity of material. The interconnected rods may form the three dimensional structure. They can form a three-dimensional mesh. A three-dimensional framework can mean, for example a set comprising a plurality of parallel meshes which are interconnected by means of transverse rods.

The reinforcement 40 and the matrix 50 are made of different materials. The reinforcement 40 may be made of metal, preferably titanium, possibly steel or aluminum. The matrix 50 may be a polymer, e.g. a thermoplastic resin such as polyetherimide (PEI). Alternatively, the reinforcement 40 may comprise a ceramic material, preferably essentially be made of ceramic and include a polymer resin. According to another alternative of the present application, the reinforcement may be of metal and include a ceramic matrix.

The reinforcement material may have a higher modulus of elasticity than the modulus of elasticity of the matrix material. Optionally, the tensile strength of the material of the reinforcement is greater than the tensile strength of the matrix material.

Figure 5:
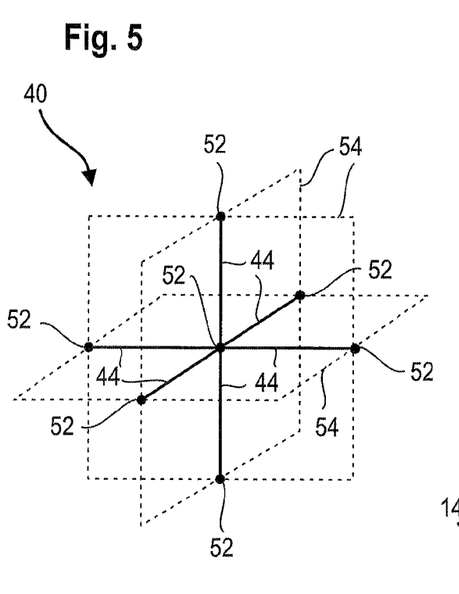
FIG. 5 outlines an arrangement of the reinforcement rods of the blade according to a first embodiment of the present application.

FIG. 5 outlines a layout of a rod 44 of the reinforcement portion 40 of the blade according to a first embodiment of the present application. The orientation of the rods may vary locally.

The rods 44 are arranged in three non-coplanar directions. The three directions may be inclined relative to each other at different angles. Three directions can be at right angles. The rods 44 then define hexahedrons such as cubes whose edges may be inclined relative to the height of the blade.

The rods 44 interconnected to each other form connecting nodes 52. Connecting nodes are typically distributed into three sets of planes 54. Each set of planes 54 comprises parallel planes, the sets of planes 54 being inclined with each other. A connecting node 52 may be connected to six other connecting nodes 52. Connecting nodes may be arranged on sets of curved surfaces, e.g. surfaces generally conforming to the pressure side surface or the suction side surface of the blade.

The rods 44 generally have the same length and the same section. The rods 44 may be straight and round. However, the length of the rods 44 may vary, as do their sections. A rod may have a different section of the other rods. One rod can see its section change, for example in diameter or in shape. A same rod can have a round cross section at one end and a square cross section at the other end. At least one rod may be curved or angled. At least one rod may be flat, spherical or cubic.

The rods 44 may have a length of less than 40 mm, preferably less than 10 mm, more preferably less than 2 mm. The rods 44 may have a width of less than 5 mm, preferably less than 0.50 mm, more preferably less than 0.10 mm.

Figure 6:
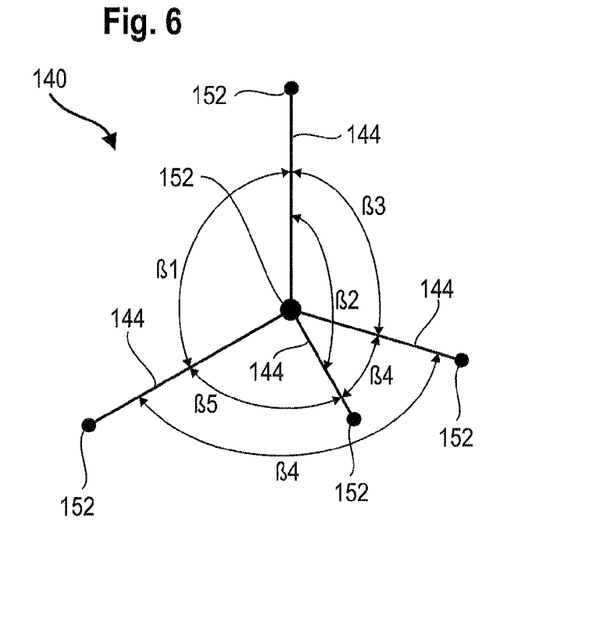
FIG. 6 illustrates an arrangement of the reinforcement rods of the blade according to a second embodiment of the present application.

FIG. 6 shows an arrangement of the rods 144 of a portion of the reinforcement 140 of the blade according to a second embodiment of the present application. This FIG. 6 uses the numbering of the preceding figures for the same or similar elements, however this numbering is incremented by 100.

The rods 144 are arranged in four non-coplanar directions, preferably in at least four non-coplanar directions. A connecting node 152 of rods 144 is connected to four other connecting nodes 152 of rods 144 which form a tetrahedron, whose center can be occupied by the common connecting node. The orientation and length of the rods vary within the reinforcement. The four directions define between them different angles ($\beta1$, $\beta2$, $\beta3$, $\beta4$, $\beta5$, $\beta6$). These angles can be equal.

According to one alternative of the present application, the reinforcing rods can be arranged in six directions, some directions being coplanar. The rods can form pyramids with a triangular base. In this configuration, a same connecting node can be connected directly to twelve other connecting nodes.

According to another alternative of the present application, the reinforcement rods are arranged by combining the rod arrangements shown above.

Figure 7:
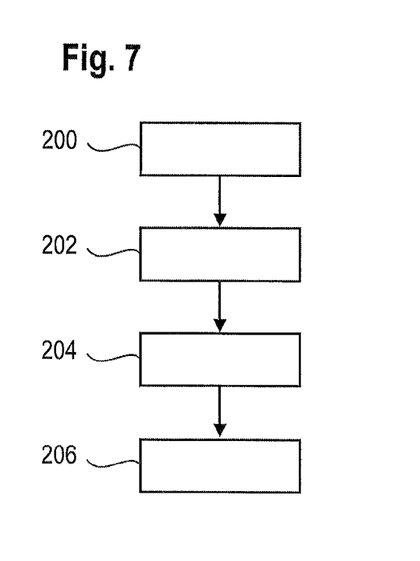
FIG. 7 shows a diagram of the steps of a method for fabricating a blade according to the present application.

FIG. 7 shows a diagram of a method of manufacturing a blade according to the present application.

The method of manufacturing a composite blade, the method comprises the following steps, which are consecutive in the following order:

(a) producing a reinforcement comprising a mesh by additive layer manufacturing (200);

(b) insertion of the reinforcement into an injection mold (202);

(c) injecting and polymerizing a resin in the injection mold (204); and (d) removing the composite blade from the mold (206).

The reinforcement of the blade is formed by additive layer manufacturing. The layers may be flat and/or of constant thickness. The reinforcement is achieved by layers of filler materials. The filler materials may be applied in molten form or in the form of powders which are subsequently solidified. The cohesion or solidification of the powders is achieved by heating the powder, for example using a laser or an electron beam.

The powders have grain sizes of less than 0.50 mm. Optionally powders are nano-powders, whose grains have a mean diameter of less than or equal to 50 nanometers. The layers forming the reinforcement may be less than 0.50 mm, preferably less than 100 microns thickness.

The reinforcing layers may be of varying thicknesses. For example, layers of thickness of less than 200 µm, preferably below 50 µm, more preferably less than 20 µm allow rapid cooling due to the heat capacity of the preceding layers of solidified material.

The layers form a stack that may be oriented along the height of the blade, the height of the blade may correspond to a radial direction of the turbine engine. The rods may be inclined relative to the direction of the stack. Preferably, the majority of the rods are inclined relative to the stack, preferably by more than 5°, more preferably by more than 20°. The rods can be predominantly inclined relative to the layers, preferably by more than 5°, more preferably by more than 20°.

The surface of the rods may have a grainy aspect, with grain shapes protruding and cavities. This grainy aspect may result from the grains of the material, optionally in the form of powder the cohesion of which maintains the general shape. The rod surface may have a roughness Ra exceeds 5 µm, preferably greater than 50 µm. Roughness Ra is the integral mean value of the differences in absolute height variations of a given profile. The method used permit to create a metallic reinforcement with rods whose grains have a homogeneous size.

The surface condition improves anchorage between the rods and the matrix. We note in passing that the process of manufacturing by additive layers promotes the filling by the matrix of the grainy surface of the rods, and in particular the filling of possible cavities in the die.

The blade can be made of a mixed manner. The platform and the fixing means may be made by molding, by machining, forging. The platform can then be used as a basis on which the reinforcement is formed by additive layer manufacturing.

It will be appreciated by those skilled in the art that different embodiments of the present application and various alternatives can be combined.

I claim:

1. A blade for a turbomachine, comprising:
   a leading edge;
   a trailing edge;
   a pressure side surface; and
   a suction side surface;
   wherein both surfaces extend from the leading edge to the trailing edge;
   wherein the blade is formed from a composite material having a matrix and a reinforcement having a mesh; and
   wherein the mesh forms a three-dimensional structure which extends over the majority of the thickness of the blade between the pressure side surface and the suction side surface and/or the majority of the length of the blade between the leading edge and the trailing edge;
   wherein the three-dimensional structure is made of rods each including two ends, the rods being joined to each other by their ends.

2. The blade according to claim 1, wherein the mesh comprises:
   an envelope which defines a space occupying the majority of the thickness of the blade between the pressure side surface and the suction side surface and/or the majority of the length of the blade between the leading edge and the trailing edge, the space of the envelope occupies the majority of the volume between the pressure side surface and the suction side surface.

3. The blade according to claim 1, wherein the three-dimensional structure of the reinforcement comprises:
   rods interconnected to each other with material continuity by connecting nodes;
   wherein the number of rods connected to the connecting nodes varies.

4. The blade according to claim 3, wherein the rods define with each other polyhedrons that occupy the majority of the volume between the pressure side surface and the suction side surface.

5. The blade according to claim 3, wherein the rods define with each other polyhedrons that occupy at least 75% of the volume between the pressure side surface and the suction side surface.

6. The blade according to claim 3, wherein the rods define with each other polyhedrons that occupy at least 95% of the volume between the pressure side surface and the suction side surface.

7. The blade according to claim 1, wherein the structure comprises:
   at least one set of rods connected together, each set forming a junction, the junction extending over the majority of the thickness of the blade and/or the majority of the length of the blade and/or the majority of the height of the blade.

8. The blade according to claim 7, wherein the rods forming a junction are inclined with respect to the main direction of said junction by one of the following:
   less than 60°;
   less than 45°; and
   less than 30°.

9. The blade according to claim 3, wherein the majority of the rods connected to a common rod are inclined relative to the common shaft by one of the following:
   more than 10°;
   more than 25°; and
   more than 60°.

10. The blade according to claim 3, wherein at least one rod is generally flat and/or at least one rod is generally spherical.

11. The blade according to claim 3, wherein the rods have variable lengths and/or variable widths.

12. The blade according to claim 1, wherein the specific volume density of the mesh is between one of the following ranges:
    1% and 80%;
    5% and 50%; and
    10% and 20%.

13. The blade according to claim 1, wherein the volume density of the mesh between the pressure side surface and the suction side surface varies along the height of the blade and/or from the leading edge to the trailing edge, the blade comprising:

fastening means;

wherein the volume density of the mesh increases in the direction of the fastening means.

14. The blade according to claim 1, wherein the reinforcement is integral and made by a method of additive layer manufacturing.

15. The blade according to claim 1, wherein the matrix and the reinforcement are made of different materials, the matrix comprising:
    a thermoplastic resin; and
    the reinforcement comprising:
    metal.

16. The blade according to claim 15, wherein the metal is titanium.

17. A turbomachine blade comprising:
    a leading edge,
    a trailing edge,
    an outer pressure side surface and an outer suction side surface, both surfaces extending from the leading edge to the trailing edge,
    a composite material with a matrix and an integral and one piece reinforcement,
    wherein the integral and one piece reinforcement forms an integral network of interconnected cavities filled with the matrix, the integral network of interconnected cavities filled with the matrix extends from the leading edge to the trailing edge and communicates from the outer pressure side surface to the outer suction side surface.

18. The turbomachine blade of claim 17, wherein the reinforcement comprises a three-dimensional mesh with rods, said rods forming the network of interconnected cavities which is filled by the matrix.

19. A turbomachine blade comprising:
    a leading edge,
    a trailing edge,
    a pressure side surface and a suction side surface, both surfaces extending from the leading edge to the trailing edge,
    a composite material including a matrix and a reinforcement with a three-dimensional mesh formed of rods,
    said rods delimiting a network of interconnected polyhedral cavities,
    said polyhedral cavities being selected from the group consisting of tetrahedral cavities and hexahedral cavities,
    said network of interconnected polyhedral cavities being filled by the matrix so as to form a solid body.

20. The turbomachine blade of claim 19, wherein the solid body extends from at least one of the following group comprising:
    the leading edge;
    the trailing edge;
    the pressure side surface; and
    the suction side surface.

* * * * *